(12) United States Patent
Peddiraju et al.

(10) Patent No.: US 9,906,991 B1
(45) Date of Patent: Feb. 27, 2018

(54) CELLULAR TELEPHONE NETWORK TO NARROW BAND—INTERNET OF THINGS NETWORK SWITCHING METHOD AND APPARATUS

(71) Applicant: Intel IP Corporation, Santa Clara, CA (US)

(72) Inventors: Bhargava Peddiraju, Bengaluru (IN); Yogender Solanki, Hanumangarh (IN); Soumen Chakraborty, Bangalore (IN)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/279,634

(22) Filed: Sep. 29, 2016

(51) Int. Cl.
*H04W 36/00* (2009.01)
*H04W 76/04* (2009.01)
*H04L 12/26* (2006.01)
*H04W 36/26* (2009.01)

(52) U.S. Cl.
CPC ......... *H04W 36/0022* (2013.01); *H04L 43/16* (2013.01); *H04W 36/26* (2013.01); *H04W 76/048* (2013.01)

(58) Field of Classification Search
CPC ............. H04W 36/0022; H04W 36/26; H04W 76/048; H04L 43/16
See application file for complete search history.

(56) References Cited

U.S. PATENT DOCUMENTS

| | | | |
|---|---|---|---|
| 9,002,393 B2* | 4/2015 | Wang | H04W 74/04 |
| | | | 455/434 |
| 9,609,632 B2* | 3/2017 | Kim | H04W 72/0406 |
| 2003/0108006 A1 | 6/2003 | Holcman et al. | |
| 2010/0232327 A1 | 9/2010 | Kim et al. | |
| 2011/0317635 A1 | 12/2011 | Swaminathan | |
| 2014/0355527 A1 | 12/2014 | Vaidya et al. | |
| 2015/0085657 A1 | 3/2015 | Hoehne et al. | |
| 2015/0189557 A1* | 7/2015 | Touati | H04W 36/0066 |
| | | | 370/332 |

(Continued)

OTHER PUBLICATIONS

Search Report dated Nov. 27, 2017 for International Patent Application No. PCT/US2017/050415.

*Primary Examiner* — Ajit Patel
(74) *Attorney, Agent, or Firm* — Schiff Hardin LLP

(57) ABSTRACT

A method and apparatus for a mobile communication device such as a mobile telephone includes a communication system that operates using narrow band-internet of things communication. The mobile communication device switches from communication using a mobile telephone communication system to communication using the narrow band-internet of things communication upon occurrence of a condition. The condition may include the mobile communication apparatus being out of range of a base station for the mobile telephone communication network or the battery level of the mobile communication device falling below a threshold. The mobile communication apparatus may switch from discontinuous reception to extended discontinuous reception If the battery power falls below a second threshold, or may switch to a power save mode if the battery power falls below a third threshold. Fewer services are available with the narrow band-internet of things communication, but the range is extended and power usage is less.

21 Claims, 5 Drawing Sheets

(56) References Cited

U.S. PATENT DOCUMENTS

| | | | |
|---|---|---|---|
| 2015/0282145 A1* | 10/2015 | Kim | H04W 76/048 455/450 |
| 2015/0341830 A1* | 11/2015 | Jeong | H04W 24/02 370/329 |
| 2016/0037390 A1* | 2/2016 | Mufti | H04W 4/22 455/404.1 |
| 2016/0100418 A1 | 4/2016 | Wu | |
| 2016/0182574 A1 | 6/2016 | Kim et al. | |
| 2016/0200357 A1 | 7/2016 | Brandon | |
| 2016/0269212 A1 | 9/2016 | Vilaipornsawai et al. | |
| 2016/0295529 A1* | 10/2016 | Rico Alvarino | H04W 52/0225 |
| 2016/0301503 A1* | 10/2016 | Rico Alvarino | H04B 1/713 |
| 2016/0337227 A1* | 11/2016 | Palenius | H04L 43/16 |
| 2016/0373973 A1* | 12/2016 | Rommer | H04W 36/0033 |
| 2017/0142615 A1* | 5/2017 | Bhalerao | H04W 28/10 |

\* cited by examiner

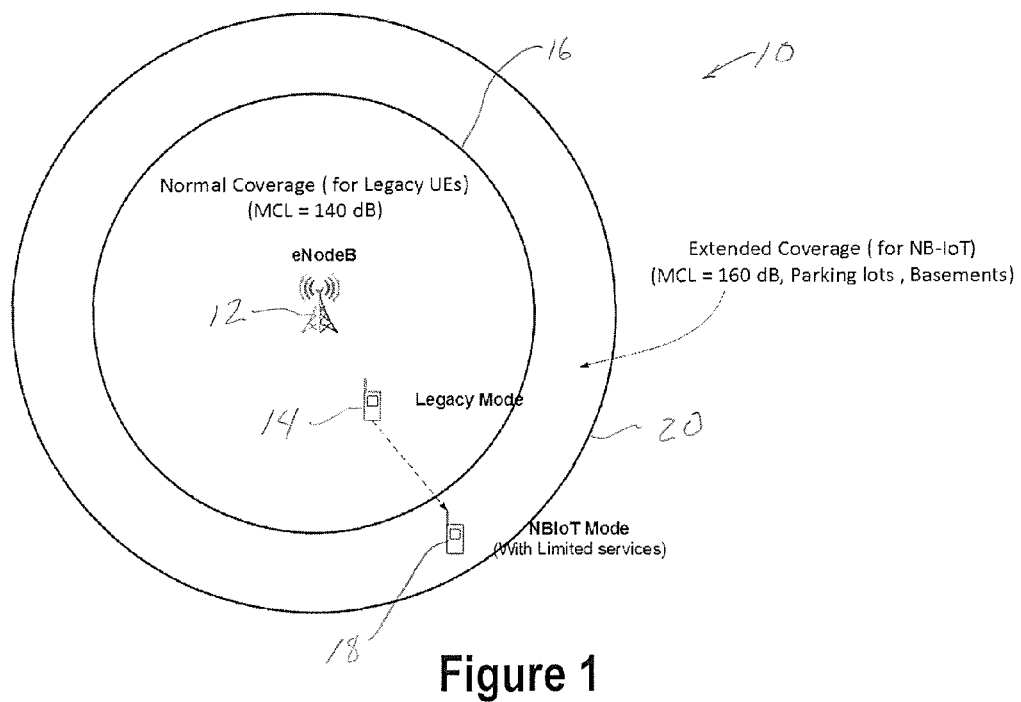
Figure 1
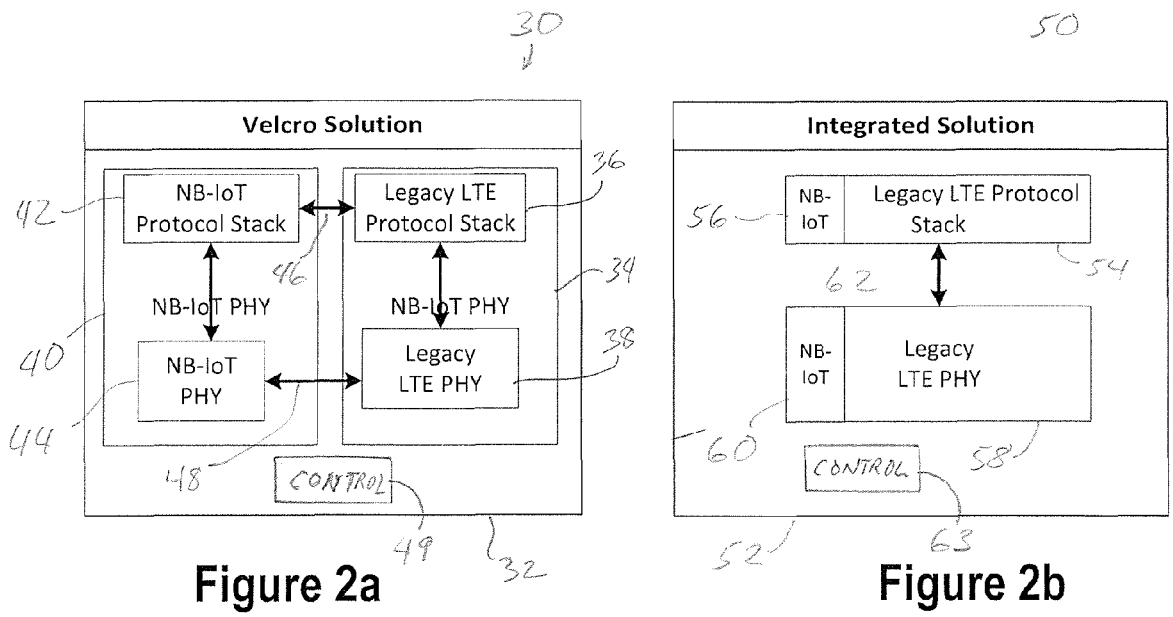
Figure 2a
Figure 2b

NB-IoT Switch

US 9,906,991 B1

CELLULAR TELEPHONE NETWORK TO NARROW BAND—INTERNET OF THINGS NETWORK SWITCHING METHOD AND APPARATUS

TECHNICAL FIELD

The present disclosure relates generally to a method and apparatus for switching between wireless communication systems in a mobile device and, more particularly, to a method and apparatus for switching between communication using a telephone network and communication using a machine type communication (MTC) or narrow band-Internet of things communication network.

BACKGROUND

Mobile communication devices such as mobile telephones, smart phones, tablet computers, personal digital assistants, e-book readers, game systems, and other mobile devices may communicate using a mobile telephone network such as a cellular mobile telephone network. A popular cellular communication standard is LTE (long term evolution), which is regularly used in smart phones and tablet computers. Another common cellular communication standard is GSM (global system for mobile communication). Cellular telephone networks provide coverage or communications over areas within the coverage range of an antenna of a cellular transmitter/receiver, which are often mounted on a tower, a building or other location. However, the communication coverage may not extend to certain areas. For example, a mobile device may be unable to establish and/or maintain a cellular communication link with a cellular transmitter/receiver if the device is located in a basement, within a parking garage, within certain buildings, or at other isolated or shielded locations. The mobile device may also be unable to establish or maintain a cellular communication link when out of range of a cellular transmitter/receiver, i.e. beyond the coverage area by the cellular network.

Mobile communication devices such as mobile telephones, smart phones, tablet computers, personal digital assistants, e-book readers, game systems, and other mobile devices require a minimum level of power to maintain communications through a mobile telephone network or cellular telephone network. The mobile device requires the minimum level power to maintain even an idle connection with the cellular transmitter/receiver. For example, maintaining an idle connection between the mobile device and the cellular transmitter/receiver in LTE operating mode may consume 4.5 mW or more of power. Maintaining an idle connection between the mobile device and the cellular transmitter/receiver in GSM (global system for mobile communication) operating mode may consume 3.5 mW or more of power. When battery power for the device falls below the required minimum level, the device may no longer communicate on the mobile telephone network.

It would be an advantage to extend the area within which the mobile device may communicate. It would be an advantage to enable communication with the mobile device using a communication system that consumes less power. It would be an advantage to enable communication by the mobile device even when battery power is low.

DESCRIPTION OF THE DRAWINGS

FIG. 1 is a schematic diagram showing an operating range of wireless communication between a cellular transmitter/receiver and a mobile device using known cellular communication technology, for example LTE, and an extended communication range available to the mobile device using narrow band-internet of things technology;

FIG. 2*a* is a functional block diagram showing a system with add-on elements to enable switching between wireless communication systems;

FIG. 2*b* is a functional block diagram showing an integrated system that enables switching between wireless communication systems;

DETAILED DESCRIPTION

Figures 3A, 3B:
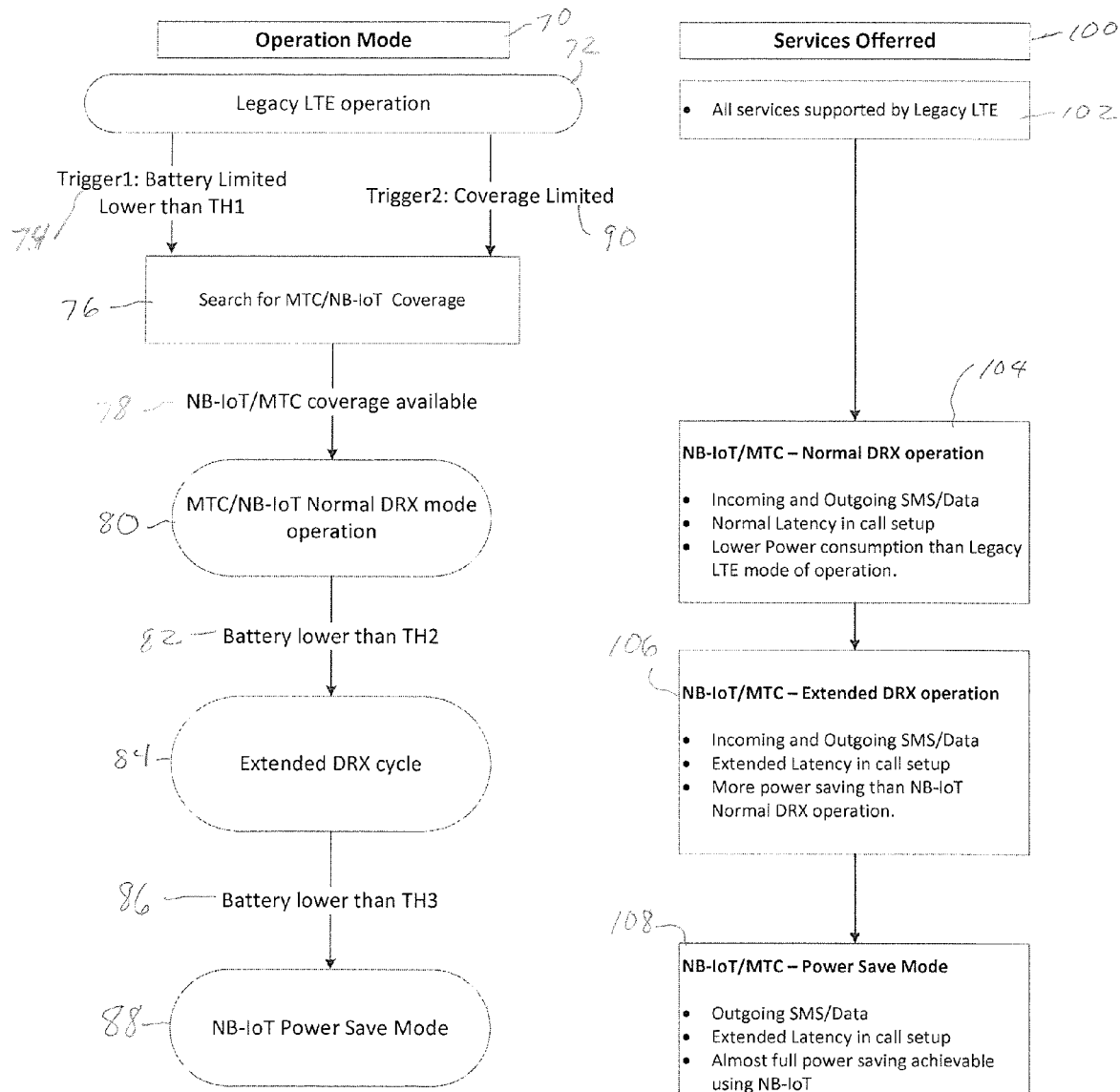
FIG. 3*a* is a flow chart showing a process for switching from an LTE network to an NB-IoT/MTC network.
FIG. 3*b* is a flow chart showing the services offered by the wireless communication systems in the wireless communication systems of FIG. 3*a*.

Currently the known MTC (machine type communication) or NB-IoT (narrow band-internet of things) use cases are targeted toward use in machines and not for use in mobile phones. User equipment such as a mobile telephone using LTE (long term evolution) cellular communication or other radio-based communications may benefit from enhancements introduced for MTC/NB-IoT communications. For example, a user equipment such as a mobile phone may benefit from power saving or extended coverage. MTC and NB-IoT communication networks are being designed to provide extended coverage (at a 15-20 dB higher sensitivity than legacy wireless communication systems) for use cases where IoT (internet of things) devices may be installed. Internet of things (IoT) network coverage may be provided in parking lots, parking garages, basements, etc. where there is no or limited cellular telephone coverage. The user equipment may remain connected in an extended coverage area for example to provide critical emergency services.

For purposes of the present method and apparatus, narrow band-internet of things (NB-IoT) communication and machine type communication (MTC) may be used interchangeably and each may refer to the other.

According to aspects of the present method and apparatus, the user equipment may utilize the internet of things network without any change in the standards that apply to wireless communication networks. Some further improvements may be provided for communications by a user equipment in an internet of things network through a change in the wireless communications standards.

In general, support of NB-IoT/MTC communications and legacy RATs (radio access technology) communications, which may include Bluetooth, WiFi, 3G, 4G and/or LTE communication, in the same UE (user equipment), such as a mobile phone in this example, may be provided either through an add-on system or an integrated system. In particular, the additional communication capability may be added to existing communications system chips or may be integrated into a single communication system chip.

Extend coverage of the communication area and/or use of lower power is provided by use of a multi-mode modem in the mobile device which modem is capable of switching to MTC/NB-IoT mode. The switch to the MTC/NB-IoT communication mode comes at a cost of limiting the set of supported communication services while in the MTC/NB-IoT mode.

In a PLMN (public land mobile network) search, after the user equipment searches for legacy RAT (radio access technology) networks and does not finding coverage, the user equipment tries to find MTC/NB-IoT coverage.

Because the MTC/NB-IoT mode requires less power of the communicating device, extend battery life may be obtained by switching the user equipment to the MTC/NB-IoT mode. This may be important if maintaining the remaining battery life of the user equipment is critical.

Switching from a legacy radio communication network (i.e. LTE) to an MTC/NB-IoT communication network may be simplified by performing a search for MTC-NB-IoT cells while the user equipment is still attached and in communication with the legacy radio communication network. The detection of MTC/NB-IoT cells while the user equipment is attached to the legacy network will be faster and without any power penalty for in-band and guard-band NB-IoT deployments. The same RF (radio frequency) samples are collected for intra-frequency measurements.

Within the NB-IoT mode, operation of the device may be chosen from normal operation, extended DRX (discontinuous reception) operation, or PSM (power saving mode) operation to optimize power consumption based on different thresholds of battery life and/or to provide different sets of services that are available at the different operation levels.

Improvement in Battery Life:

It may be possible to extend the battery life of a user equipment by switching the communication from a cellular telephone network communication to communications via a NB-IoT mode. Comparative examples are provided of a legacy LTE modem (a multimode platform) and an NB-IoT modem with idle mode power consumption for a DRX cycle of 1280 ms. A reduction of about 75% in power consumption is seen for the NB-IoT modem when compared with LTE mode of operation. When compared with the GSM mode of operation, power consumption is reduced by about 65% when compared to NB-IoT communication mode.

| Comparison with legacy LTE Multimode | Die size reduction | Reduction in Idle mode Power consumption (no PSM with DRX cycle of 1280 ms) | |
|---|---|---|---|
| platform NB-IoT Modem | (with all interconnects) | LTE functionality | GSM functionality |
| | ~85% | ~75% | ~65% |

The improvement in overall power consumption for the different use cases detailed in herein is shown in the table below.

| Use case | Improvement in Battery life |
|---|---|
| Switch to NB-IoT: Normal DRX Cycle | Battery life improves by a factor of 4.5 |
| Switch to NB-IoT: Extended DRX Cycle | Battery life improves by a factor of 4.5 (when compared to extended DRX in legacy) |
| Switch to NB-IoT: (Power Save Mode) PSM Mode | For all practical purpose battery is preserved till next charge, and used only for user initiated SMS services. |

The decision criteria for the user equipment operation to be switched from legacy RATs to MTC/NB-IoT is described in greater detailed with reference to the figures. In certain embodiments, the switch from LTE, for example, to NB-IoT comes at a cost of fewer available services via the user equipment.

An even greater power saving can be accomplished by switching the operation while using NB-IoT communications from extended DRX to Power Save Mode (PSM). In the power save mode, the user equipment conserves power by going into a deep sleep with a power consumption of about 15 µW; however, only user equipment initiated data services with low data rate requirements, such as SMS (short message service), will be available in power save mode.

Improvement in Cell Coverage:

User equipment, such as a mobile telephone, may become unreachable when legacy cellular coverage is not available. The cell communication range of the user equipment may be extended according to aspects of the present method and apparatus, but in the extended coverage area the multimode user equipment only supports services that are supported by the NB-IoT communication network.

Referring to FIG. 1, a diagram of coverage area for communications provides a simplistic representation with a single transmitter/receiver antenna 12. The transmitter/receiver antenna 12 may be a base station in a GSM system or an eNode B transmitter/receiver in an LTE system. The transmitter/receiver 12 may instead represent a WiFi node, a Bluetooth system, or any other wireless communication system. In the example, the transmitter/receiver antenna 12 is operable to communicate with a mobile device 14 within its operating range. For a cellular telephone system, the range is referred to as a cell, and indicated by a circle 16. The mobile device 14 is within the cell coverage area or cell 16 and so may communicate with the eNode B or other antenna 12. As indicated in the figure, the wireless service within the cell 16 includes normal coverage for a compatible user equipment 14. The MCL (maximum coupling loss) for establishing and maintaining communication within the cell 16 is about 140 dB. The cell 16 is shown as circular in shape, but may be other shapes depending on obstacles and the like. In most installations a plurality of transmitter/receiver antennas are provided in an arrangement of overlapping cells.

In FIG. 1, a mobile device 18 may be located outside the coverage area or cell 16. The mobile device 18 may be the same mobile device 14 as shown within the cell 16 which has been moved out of the cell 16 or the device 18 may be a different mobile device. The mobile device 18 cannot establish and maintain communications with the transmitter/receiver 12 as a result of distance or because of blocking or shielding of the signals between the mobile device 18 and the transmitter/receiver 12 or for other reasons. Any mobile telephone communications between the mobile device 18 and the transmitter/receiver 12 ceases. In some aspects, the mobile telephone communications may be considered to have been paused. The mobile device 18 is however within range of a narrow band-internet of things (NB-IoT) network as indicated by 20. The narrow band-internet of things network may operate according to LTE standards and may operate according to a proposed future narrowband 5G standard. The mobile device 18 is able to establish and maintain communications with the transmitter/receiver 12 in the extended range, as indicated between the outer boundary of the cell 16 and within the coverage area 20. The maximum coupling loss (MCL) for the extended coverage area is 160 dB. As a result of the extended range, the coverage area may extend to for example parking lots, basements, parking garages, and other structures and locations where the cell coverage 16 is not available.

The aspects of the present method and apparatus may be provided without a change to the current communication standards. A device such as a mobile device including a cellular telephone or tablet computer may be provided with support for both legacy RATs and MTC/NB-IoT in the same device. Such a device may be implemented in any of several different ways. For example, different decision criteria may be applied for switching between legacy radio access technologies (RATs) and NB-IoT.

In a first aspect, the determination for switching between the two technologies is based on coverage limitations. A modification may be made in the PLMN (public land mobile network) search procedure to identify the extended network to which the user equipment will switch in response to the device being outside of the coverage area of the mobile telephone network.

In a second aspect, the determination for switching between the two technologies is based on the remaining battery life of the mobile device or user equipment. The switch to the NB-IoT communications as a power saving measure may be performed automatically by the device upon sensing a predetermined battery power level or other criteria or event. The switch may be performed at the permission of the user who may be asked for approval for the switch.

The switch may be performed when requested by the user or by another party so that battery power of the device may be preserved. The user or another party may set a level, an event, or other criteria at which the switch is made. Different triggers may be provided to cause the user equipment to go into different power saving states.

In a third aspect, the determination for switching between the two technologies is based on the services requested or required by the user or by another party. The NB-IoT or MTC communication mode has limitations on supported services that differ from those of other wireless communication technologies, such as LTE. Based on a service required by the user equipment, the communication network may be switched between the two technologies.

The present method and apparatus may detect the presence of NB-IoT cells for in-band and guard-band deployment when the user equipment is attached to legacy RAT, using an RF capture for intra-frequency measurements.

As described herein, the present method and apparatus provides switching between the RATs without standards support. However, the method and apparatus may provide further advantages and features if the standards that apply are changed. For example, the present method and apparatus may indicate to a caller that the user equipment has been switched from a full service radio access communication to an MTC/NB-IoT communication, or may indicate to a caller that the user equipment only supports certain services while connected for the MTC/NB-IoT communications.

A change in the standards may provide for fast switching between the legacy radio access communication network and the MTC/NB-IoT network. Fast switching may be particularly provided for switching to and from in-band and/or guard band NB-IoT. The in-band and guard band and legacy system switching may be more readily provided when the MTC/NB-IoT communication and legacy communication are with the same eNode B or base station.

Possible Device Configurations:

A possible device configuration provides that a NB-IoT communication system may be provided in a phone with a multimode modem and that the communication may be switched between the legacy telephone and NB-IoT communications. Since NB-IoT chips are of very low cost and small die size, it is feasible technically and in terms of cost to either add the NB-IoT chip to the phone or to combine the two systems together into a single chip or system in the phone.

In FIG. 2a, a communication system 30 is provided with an add-on for providing the switching function to device 32 having a legacy LTE wireless communication system 34. In the figure, the add-on functionality is referred to as a Velcro solution. The legacy LTE communication system 34 includes a legacy LTE protocol stack 36 that communicates with a legacy LTE PHY (physical layer) 38. The legacy LTE communication system 34 operates to enable the device 32 to communicate on an LTE network.

The add-on functionality is provided an add-on communication system 40 within the device 32. The add-on communication system 40 includes an NB-IoT protocol stack 42 that communicates with an NB-IoT PHY (physical layer) 44. The add-on communication system 40 operates to enable the device 32 to communicate on a narrow band-internet of things network. The NB-IoT protocol stack 42 is connected at 46 with the legacy LTE protocol stack 36 and the NB-IoT physical layer 44 is connected at 48 with the legacy LTE physical layer 38. A control 49 is provided to control whether the mobile communication device communicates using the legacy LTE system 34 or the narrow band-internet of things system 40, for example using conditions discussed herein.

In FIG. 2b, an integrated system 50 is provided in a device 52. The integrated system 50 includes a legacy LTE protocol stack 54 which has a narrow band-internet of things protocol stack functionality at 56. The device 52 has a legacy LTE physical layer (PHY) 58 which also handles procedures related to a narrow band-internet of things physical layer component 60. The protocol stack 54 and physical layer 58 communicate with one another as indicated at 62. A control 63 is provided to control whether the mobile communication device communicates on the LTE system or on the narrow band-internet of things system, as determined by the conditions described herein.

FIG. 3a shows an operation mode 70 for a mobile device. The device may operate in in a legacy LTE operation mode as indicated at 72. In the illustrated example, a first trigger at 74 occurs when the battery of the device drops below a first threshold TH1. When the first trigger occurs, a search is begun for MTC/NB-IoT coverage, as indicated at 76. In the example, the MTC/NB-IoT coverage is available, as indicated at 78. The device switches to the MTC/NB-IoT communication network in a normal DRX (discontinuous reception) mode of operation, as indicated at 80. The device ceases communicating using the legacy telephone communication mode. The device may operate at the normal DRX mode until the battery level drops below a second threshold TH2 as indicated at 82. The second threshold 82 is at a lower battery power level than the first threshold 74. Once the battery level drops below the second threshold 82, the device operates on an extended DRX cycle at indicated at 84. The extended DRX cycle will be explained in further detail herein. If the battery power level drops further and for example drops below a third threshold level TH3 as indicated at 86, which is a level lower than the second threshold level TH2 at 82, the device switches to an NB-IoT power save mode as shown at 88.

Of course, the operation mode shown illustrates an example in which the device is not connected for recharging of the battery before reaching the power save mode. If the battery is recharged at some point in the process, the operating mode may return to the legacy LTE operation 72 and reestablish the telephone communication. In certain examples, the charging of the battery to exceed the third threshold level TH3 at 86 causes the device to change from power save mode to extended DRX cycle mode. If the battery is charged further so that the battery power level exceeds the second threshold TH2 at 82, the device may switch from extended DRX cycle mode at 84 to MTC/NB-IoT normal DRX mode operation at 80. Further charging of the battery so that the battery exceeds the first threshold TH1 at 74 may cause the device to return to LTE operation at 72 and reestablish the telephone communication. Although the arrows in the diagram 70 show the flow process in a single downward direction, the process may flow in either the upward or downward directions depending on movement of the device into and out of coverage areas, receipt of commands from the user or from others, and changes in the battery level relative to threshold levels.

Although three threshold levels TH1, TH2 and TH3 are shown, it is also possible that a single threshold level may be provided or only two thresholds or more than three thresholds may be provided.

The operation mode diagram 70 also provides for a second trigger. If the device is operating using the LTE operating mode at 72, and the device is moved out of an LTE coverage area, the device sense the limited coverage and activates the second trigger at 90. The device begins searching for MTC/NB-IoT coverage at 76. If MTC/NB-IoT coverage is available at 78, the device switches operating mode to communicate using MTC/NB-IoT normal DRX operation, as indicated at 80. If the power level of the battery drops below the second and third thresholds TH2 and TH3 as shown at 82 and 86, the operating mode may change to the extended DRX and power save modes as needed. However, since the second trigger 90 is unrelated to the battery level, it is possible that the device may return to an LTE coverage area while still having a battery power level above the first threshold TH1, in which case the device may return to LTE operation 72.

The thresholds may depend on the specific UE and on other parameters like running applications, battery capacity, user activity etc., and could well be UE vendor specific. One example, though, could be in terms of percentages of battery charge, such as for threshold 1: ~20%, threshold 2: ~13%, threshold 3: ~10% of battery power. In certain examples, these may be overridden by the user or another party.

Two triggers are shown in the example. It is envisioned that only one of the triggers may be provided for example either the battery level trigger or the coverage trigger. It is also envisioned that additional triggers may be provided as well. For example, the device may have a user selectable mode to switch the operation from LTE to MTC/NB-IoT mode, or to any of the other modes. The example discloses LTE mode. Other communications networks may be provided instead, such as GSM, 3G, 4G, WiFi, Bluetooth, or other wireless technologies.

FIG. 3*b* is a diagram of services offered 100 shown alongside the operating mode levels of FIG. 3*a*. Aligned with the LTE operation 72 of the operating mode is a block 102 showing that when operating at LTE mode, the device overs all services supported by legacy LTE communications. If the device switches to MTC/NB-IoT normal DRX mode at 80, the services offered in this mode may include incoming and outgoing SMS/data, normal latency in call set up, and lower power consumption than legacy LTE mode of operation, as shown at 104. If the device switches to extended DRX cycle at 84 the services in this mode are show at 106. The services may include incoming and outgoing SMS/data, extended latency in call setup, and more power saving than MTC/NB-IoT normal DRX operation. If the device switches to the power save mode at 88, the services offered may include outgoing SMS/data, extended latency in call setup, and almost full power saving achievable using NB-IoT as indicated at 108.

Figure 4A:
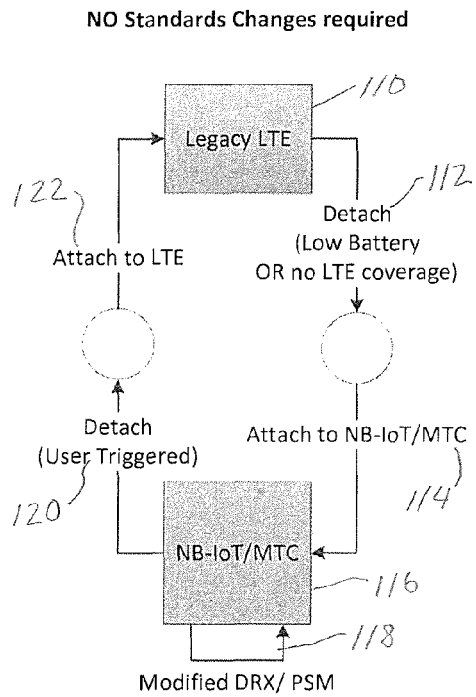
FIG. 4*a* is a block diagram showing connection processes for switching wireless communications of FIG. 3*a* under current standards.

FIG. 4*a* shows a first method of switching services between LTE or other legacy communication and MTC/NB-IoT. The mobile device operates in LTE mode as shown at 110. When triggered to change operation, such as by lack of LTE coverage or low battery power, the device detaches from the LTE network at 112 and then attaches to the MTC/NB-IoT network at 114. Once attached, the device operates on the MTC/NB-IoT network as indicated at 116. If needed, the device may operate in the modified DRX mode or power save mode as shown 118, which is performed without detaching and attaching. To switch the device back to LTE mode, the device must detach from the MTC/NB-IoT network as shown at 120. The detachment may be user triggered or may be automatic. Once detached from the MTC/NB-IoT network, the device attaches to the LTE system at 122 and returns to LTE operation. In order for the device to make the change between the LTE network and the MTC/NB-IoT network, the device must detach from one and then attach to the other. The attaching may include searching for a signal, handshaking, exchange of identity information, etc. The detaching/attaching steps are required under the current standards, which do not permit switching between the two systems.

Figure 4B:
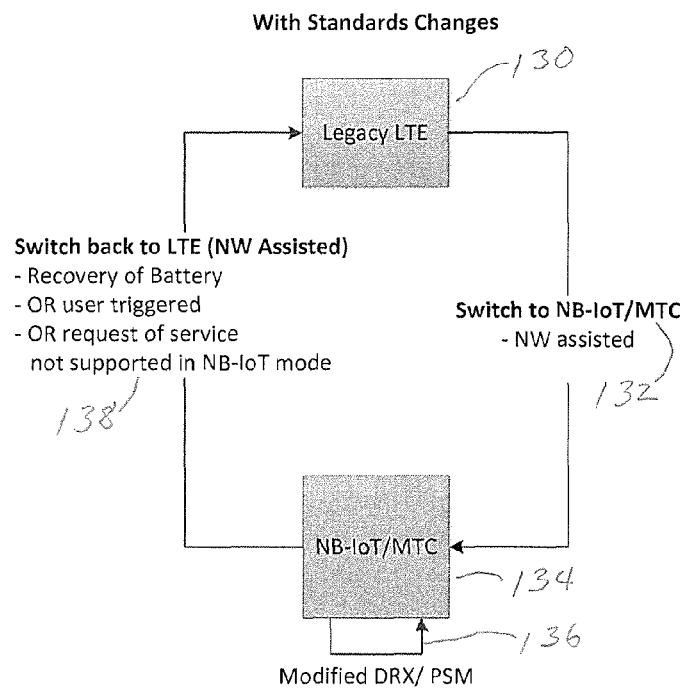
FIG. 4*b* is a block diagram showing connection processes for switching wireless communications of FIG. 3*a* under a modified standard.

FIG. 4*b* shows switching of operating modes if a change is made in the standards to accommodate switching. A device operates in LTE mode at 130. When triggered to change, the device performs a switch from LTE to MTC/NB-IoT at 132 using network assistance (NW assisted). In particular, the LTE network may provide identify information and other information about the device and the connection to the MTC/NB-IoT network. Once the operation is switched, the device operates on the MTC/NB-IoT network as shown at 134. The operation may include operation with a modified DRX mode or a power save mode as shown at 136. When the switch is made make to the LTE mode from the MTC/NB-IoT network, the switch is also network assisted as indicated at 138. In this example, the switch may be made from MTC/NB-IoT to LTE by recovery of the battery power level, or when triggered by a user, or when a request is made for a service that is not supported by the MTC/NB-IoT mode.

Without a standards change, the UE has to signal a detach event from LTE network, and perform additional signalling to attach to the NB-IoT network. This may also include a fresh search of NB-IoT PRBs (physical resource blocks) and subsequent control messaging from the network. With a standards change, the network can treat the switch as a kind of Inter RAT handover and send the details of the PRB location and assist in its transition. This will save signalling overhead and speeds up the procedure. The handovers resemble the Inter RAT handovers are used in legacy RATs. But the handovers according to the present method and apparatus may be UE initiated in this case, depending on its own status based on chosen evaluation criterion for switching.

Figure 5:
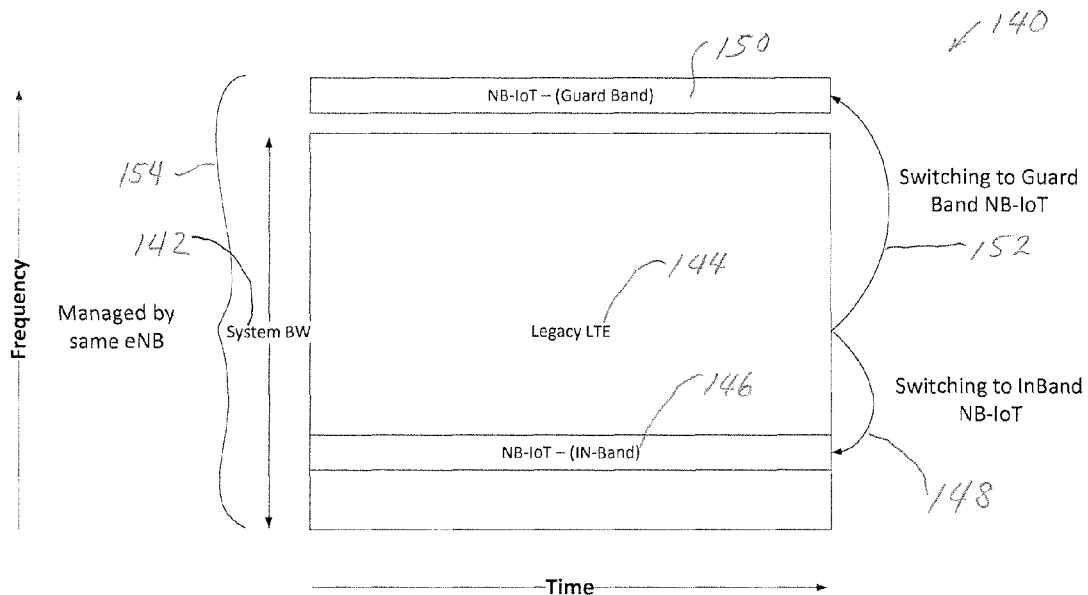
FIG. 5 is a graph of frequency over time showing bands for communication using an LTE network and for communication using a narrow band-internet of things network.

FIG. 5 shows a frequency graph 140. The device has a system bandwidth (BW) as indicated at 142. Within the system frequency band is the frequencies for operating the legacy LTE communication mode as indicated at 144. NB-IoT may operate at a frequency that is within the system bandwidth 142 and which itself occupies a small bandwidth, as shown at 146. This is referred to as in-band NB-IoT. It is also foreseen that the NB-IoT mode may operate at frequencies outside of the legacy LTE bandwidth, for example in a band 150. The band 150 may be adjacent or near the system bandwidth 142 and may be referred to as a guard band. MTC operates within LTE bandwidth so it is not necessary to define in-band and guard bands for MTC communications. In-band and guard band communications are defined for NB-IoT communications. Switching from the LTE frequencies to the MTC/NB-IoT frequencies is shown by arrow 148. In the illustration, switching from the LTE mode to the NB-IoT mode in a guard band is shown by an arrow 152. As shown by the bracket 154, signals at frequencies within the LTE system bandwidth including the MTC, NB-IoT in-band frequencies, as well as the guard band frequencies if a guard band NB-IoT mode is selected, all may be managed by the same e Node B, or base station, as well.

In certain examples, the LTE communications may operate over a bandwidth of greater than 1.4 MHz. The NB-IoT communications may operate over a bandwidth of about 200 KHz. When the UE switches its mode to NB-IoT, it will still be in contact with an NB-IoT eNB. Effectively, the UE (user equipment) stops receiving in its legacy RAT mode and switches to 200 KHz bandwidth reception following NB-IoT protocols. This will enable the UE to leverage the features provided by NB-IoT standard, especially, significant power saving and extended coverage.

The NB-IoT has the following 3 options to deploy its 200 KHz bands. Standalone: This mode has NB-IoT deployed as a separate 200 KHz band altogether. This mainly corresponds to re-farmed GSM carriers (those that used to be for GSM deployment, but no longer used). Guard band: Since the bandwidth is only 200 KHz, an entire NB-IoT system can be deployed within the guard bands separating different LTE bands. This is the Guard band mode. In band: A bandwidth of 200 KHz corresponds to about 1 PRB (physical resource block) (180 KHz) in LTE. So, an operator can deploy NB-IoT within the LTE band, with one or more PRBs dedicated to NB-IoT usage. The eNB takes care of the scheduling part to prevent legacy LTE UEs from using these PRBs.

Figure 6:
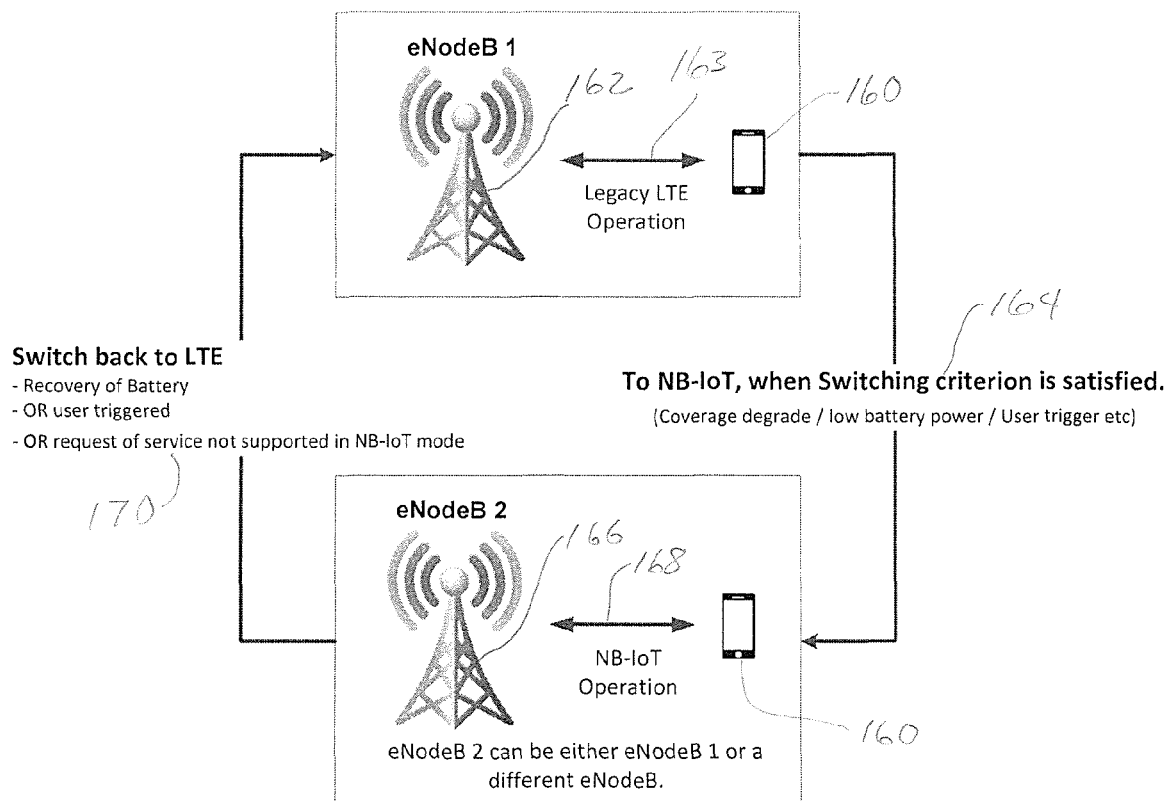
FIG. 6 is a schematic illustration of communication switching between a mobile device and an eNode B or base transceiver.

With reference to FIG. 6, a mobile device such as a smart phone 160 is attached to a base station or e Node B1 162, which may be a cellular telephone tower or other antenna or transceiver, to provide LTE operation according to legacy LTE standards as shown at 163. When a switching criteria is satisfied, such as by degraded coverage, low battery power, or a user selection or trigger, the communications are switched as shown at 164 so that the mobile device 160 communicates with a base station or e Node B2 166 to provide communication using the MTC/NB-IoT mode as shown at 168. The base station 166 used for the MTC/NB-IoT mode may be the same base station 162 as used for the LTE mode, or the base station 166 may be a different base station than the base station 162 used for communication in the LTE mode.

When switched back to LTE operation from the MTC/NB-IoT mode, as shown at 170, the mobile device may switch modes while communicating with the same base station or may switch modes and also switch base stations. The base station 162 to which the communications are switched may be the same base station 162 with which the mobile device communicated when previously used for LTE communication, or the base station may be a different base station. The switch from MTC/NB-IoT mode to LTE mode may be the result of recovery of the battery power, a user triggered change, or a request for a service not supported by the MTC/NB-IoT mode.

Figure 7:
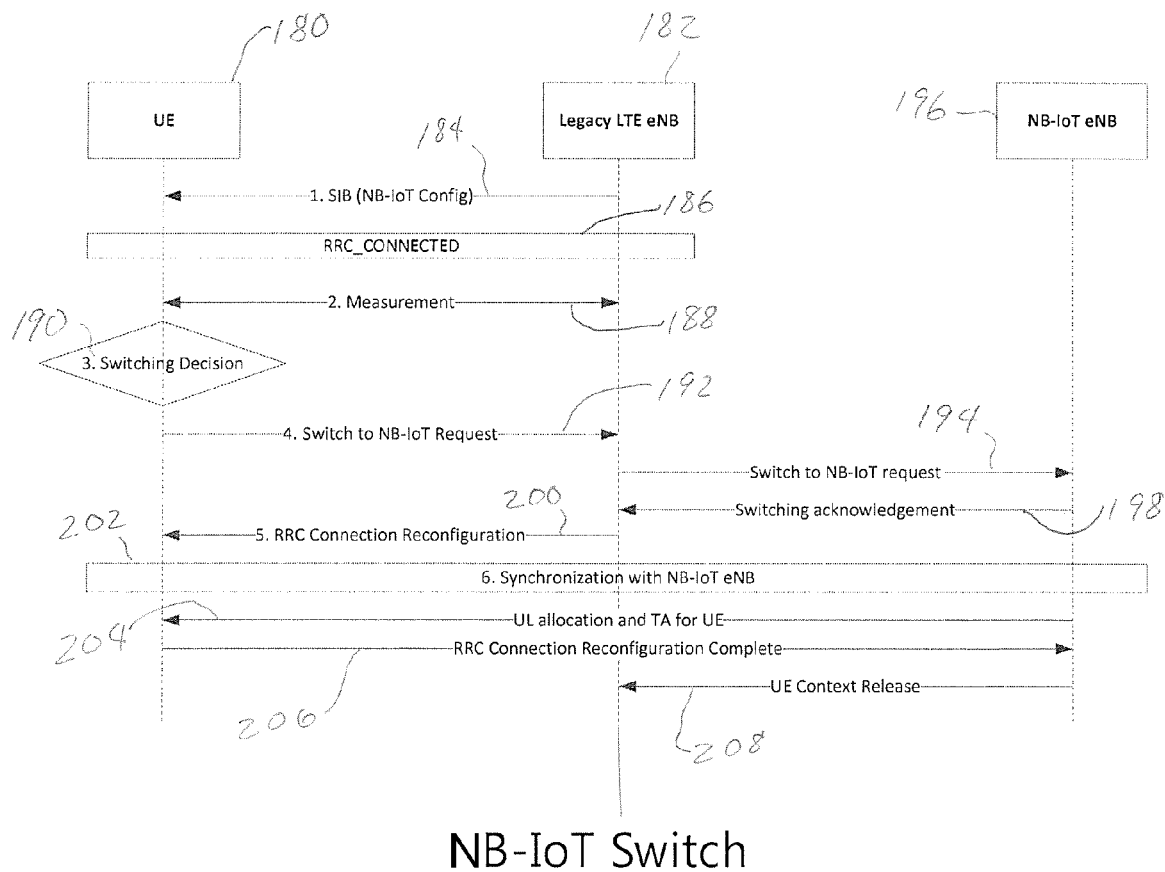
FIG. 7 is a communication diagram showing switching between a cellular network and a narrow band-internet of things network.

In FIG. 7, user equipment 180 is shown making a switch to a MTC/NB-IoT mode, with support from legacy communication standards for switching. A legacy LTE e Node B or base station 182 sends a first message 184 to the user equipment 180 at a given periodicity. The first message 184 is a SIB (system information block) message providing NB-IoT configuration information. An RRC (radio resource control) Connected communication 186 is established between the user equipment 180 and the base station 182. A measurement is performed at 188. In this example, the measurement 188 has indicated the received signal strength, for example, as sensed by the user equipment. A switching decision 190 is made based on the measurement 188.

A request 192 to switch to the MTC/NB-IoT mode is sent from the user equipment 180 to the base station 182. The base station 182 sends a request 194 to switch to the MTC/NB-IoT mode to a MTC/NB-IoT e Node B base station 196. The MTC/NB-IoT base station send a switching acknowledgement 198 back to the LTE base station 182. The LTE base station 182 sends an RRC connection reconfiguration message 200 to the user equipment 180. A connection 202 is established for synchronization of the user equipment with the MTC/NB-IoT e Node B base station 196. The MTC/NB-IoT base station 196 send a message 204 to the user equipment 180 relating to UL (uplink) allocation and TA (tracking area) for the user equipment. The user equipment 180 returns a signal 206 to the MTC/NB-IoT base station 196 to show that the RRC connection reconfiguration is complete. Lastly, the MTC/NB-IoT base station 196 send a signal 208 to the LTE base station 182 informing the LTE base station 182 that the user equipment may be released as a context release.

If support from the 3GPP standard is favored, then to switch from legacy LTE to NB-IoT, flow could be as follows. The UE sends an RRC message to switch the RAT to NB-IoT. The network sends an RRC connection reconfiguration message with details on: EARFCN used for the NB-IoT PRB, Frequency offset with respect to the EARFCN (E-UTRAN Absolute Radio Frequency Channel Number), PCI (physical cell identity) for that, and Mode of deployment of the NB-IoT PRB. The user equipment may then use this information to transition from LTE to NB-IoT, do the initial synchronization and start off with camping. SIBs can also have these contents to facilitate easy switching when UE decides to do so.

Thus, there has been shown and described a hardware system following two approaches, a Velcro solution or add-on system, in which each RAT has its own modem connected by a shared interface. In the second system, an integrated solution is provided in which hardware for a legacy LTE PS and PHY is re-used with the MTC/NB-IoT physical layer and protocol stack. Power domain downscaling may be provided in the integrated system.

In the MTC/NB-IoT mode, certain services are not available. However at very low battery, or when coverage from legacy RATs are not available it may be very valuable to remain reachable through SMS, and preserve battery for UE (user equipment) initiated calls/SMS.

When battery power goes below Threshold_1, or when the user equipment goes out of coverage and does not find any of the legacy RATs, the user equipment shall initiate a PLMN (public land mobile network) search for MTC/NB-IoT coverage. When the battery life falls even further, the user equipment switches to Extended DRX cycles. When power goes below Threshold_3, the user equipment starts using PSM (power save mode) after notifying the NW (network) about the power condition. The mechanism to send this indication is already there for NB-IoT and MTC.

Without standards change, the transition from the LTE to the NB-IoT mode and vice versa has to be through a detach-and-attach procedure. However, for the extended coverage trigger it anyway does not matter, as the user equipment shall have to find the MTC/NB-IoT coverage on its own.

An optimization in NB-IoT cell detection may be provided when the user equipment battery is low or when the user equipment's legacy coverage is getting weaker. The user equipment can already search for NB-IoT coverage while the user equipment is connected to Legacy LTE, especially for in-band and guard-band NB-IoT deployment.

The position of a legacy LTE and in-band/guard-band NB-IoT managed by the same eNB has been shown in FIG. 5, so a common RF capture for intra-frequency measurement may be processed to detect the presence of an in-band NB-IoT. In case of a guard-band the RF (radio frequency) capture needs to be wider. However the user equipment does not have to tune the RF to other frequencies and try to detect for in-band and guard-band deployments. This would result in faster identification of in-band/guard-band NB-IoT cells:

A standard changes may be provided. For example, the following 3GPP standard support will make the use of mode switching more efficient. A new standard may provide system information in legacy LTE to indicate the availability of NB-IoT networks. A new standard may provide additional SIBs (signal information blocks) in LTE indicating the presence of NB-IoT cells in the same eNB (e Node B) or in the neighborhood. A new standard may provide an indication to the caller after a mode switch.

After the user equipment is switched to the NB-IoT/MTC mode, the user equipment according to certain aspects cannot support a voice call (in NB-IoT mode), and network can inform the caller about user equipment's non-availability for a voice call but report its availability over SMS. When the user equipment is switched back to LTE, NW (network) can indicate to the callers about availability of the user equipment for voice call again.

New standards may provide network assistance for mode switching. Handover-like signaling may be provided to assist the user equipment to do the mode switch from LTE to NB-IoT and vice versa. In the mode switch command, the eNB can indicate to the user equipment details such as in-band/guard band/standalone NB-IoT operation, etc.

Additions may be provided in user equipment capability information. The user equipment may indicate its capability to switch between the two modes during the user equipment capability exchange. The network may then be ready to support such a switch whenever the battery level or a user triggers it. The entire detach and attach procedure can be skipped.

In a first aspect, a method for operating a mobile communication device, comprising: establishing a first communication link between the mobile communication device and a first base station based on a mobile telephone communication; ceasing the first communication between the mobile communication device and the first base station; establishing a second communication link between the mobile communication device and a second base station based on a narrow band-internet of things communication.

In a second aspect, a method of the first aspect, wherein the ceasing communicating and the establishing a communication link are performed in response to a battery level in the mobile communication device falling below a predetermined threshold.

In a third aspect, a method of the second aspect, wherein the predetermined threshold is a first threshold; and further comprising: communicating between the mobile communication device and the second base station using the narrow band-internet of things communication based on a first communication type using a first battery power; ceasing communicating using the narrow band-internet of things communication based on the first communication type in response to the battery level falling below a second predetermined threshold; and communicating using the narrow band-internet of things communication according to a second communication type in response to the battery level falling below the second predetermined threshold, the second predetermined threshold being a lower battery power level than the first predetermined threshold, the second communication type using less battery power than the first communication type.

In a fourth aspect, a method of the third aspect, wherein the first communication type is discontinuous reception, and wherein the second communication type is extended discontinuous reception.

In a fifth aspect, a method of the third aspect, further comprising: ceasing communicating using the second communication type in response to the battery power level falling below a third predetermined threshold, the third predetermined threshold being at a battery power level that is lower than the second predetermined threshold; and communicating between the mobile communication device and the second base station using a third communication type in response to the battery power level falling below the third threshold, the third communication type using less battery power than the second communication type.

In a sixth aspect, a method of the fifth aspect, wherein the third communication type is a power saving mode.

In a seventh aspect, a method of the first aspect, wherein the first base station and the second base station are the same base station.

In an eighth aspect, a method of the first aspect, wherein the first base station and the second base station are different base stations.

In a ninth aspect, a method of the first aspect, wherein the ceasing communicating and the establishing communication are performed upon the mobile communication device being out of range of the first base station.

In a tenth aspect, a method of the first aspect, wherein the ceasing communicating and the establishing communication are performed upon receiving a user command.

In an eleventh aspect, a method of the first aspect, wherein the ceasing communicating includes detaching a communication link between the mobile communication device and the first base station, and wherein the establishing communication included attaching a communication link between the mobile communication device and the second base station.

In a twelfth aspect, a method of the first aspect, wherein the ceasing communicating and the establishing communication includes a handover of the mobile communication device information from the first base station to the second base station.

In a thirteenth aspect, a method of the first aspect, wherein the communicating using the narrow band-internet of things communication uses a communication system added-on to a mobile telephone communication system in the mobile communication device.

In a fourteenth aspect, a method of the first aspect, wherein the communication using the narrow band-internet of things communication uses a communication system integrated with a mobile telephone communication system in the mobile communication device.

In a fifteenth aspect, a method of the first aspect, wherein the narrow band-internet of things communication operates at frequencies that are in either guard band frequencies or in-band frequencies of the frequencies at which the mobile telephone communication operates.

In a sixteenth aspect, a method of the first aspect, wherein the mobile telephone communications include LTE mobile telephone communications.

In a seventeenth aspect, a mobile communication apparatus, comprising: a first communication system configured to establish communication between the mobile communication apparatus and a first base station based on a mobile telephone communication; and a second communication system configured to establish communication between the mobile communication apparatus and a second base station based on narrow band-internet of things communication.

In an eighteenth aspect, a mobile communication apparatus of the seventeenth aspect, wherein the second communication system is added-on to the first communication system.

In a nineteenth aspect, a mobile communication apparatus of the seventeenth aspect, wherein the second communication system is integrated with the first communication system.

In a twentieth aspect, a mobile communication apparatus of the seventeenth aspect, further comprising: a control for switching between the first communication system and the second communication system upon detecting a predetermined condition.

In a twenty-first aspect, a mobile communication apparatus of the twentieth aspect, wherein the predetermined condition is a condition selected from the set of conditions consisting of: a battery power level below a predetermined threshold, the mobile communication apparatus being out of range of the first base station, and receipt of a user command to switch communication systems.

In a twenty-second aspect, a mobile communication system of the seventeenth aspect, wherein the mobile telephone communication includes LTE communication.

In a twenty-third aspect, a method adapted to operate an apparatus used in a mobile communication device, the method comprising: establishing a first communication between a first base station and the mobile communication apparatus using mobile telephone communication, wherein the mobile communication apparatus is within range of the first base station and has a battery power level above a predetermined threshold; ceasing the first communication when the mobile communication apparatus is out of range of the first base station or the battery power level is at or below the predetermined threshold; establishing a second communication between a second base station and the mobile communication device based on narrow band-internet of things communication.

In a twenty-fourth aspect, a method of the twenty-third aspect, further comprising: resuming the first communication between the mobile communication apparatus and the first base station when the mobile communication apparatus is within range of the first base station or the battery power is above the predetermined threshold.

In a twenty-fifth aspect, a method of the twenty-third aspect, wherein the ceasing the first communication is in response to receipt of a user command.

In a twenty-sixth aspect, a method of the twenty-third aspect, wherein the narrow band-internet of things communication includes discontinuous reception communication between the mobile communication device and the second base station.

In a twenty-seventh aspect, a method of the twenty-third aspect, wherein the first base station includes a plurality of first base stations.

In a twenty-eighth aspect, a method of the twenty-third aspect, wherein the first base station and the second base station are a same base station.

In a twenty-ninth aspect, a method of the twenty-third aspect, wherein the first base station is a different base station than the second base station.

In a thirtieth aspect, a method of the twenty-third aspect, wherein the ceasing communication using the mobile telephone communication includes detaching the mobile communication apparatus from the first base station, and wherein the initiating communication using narrow band-internet of things communication includes attaching the mobile communication apparatus to the second base station.

In a thirty-first aspect, a method of the twenty-third aspect, wherein the mobile telephone communication includes LTE (long term evolution) mobile telephone communication.

In a thirty-second aspect, a method of the twenty-third aspect, wherein the first and second base stations are eNodeB base stations.

In a thirty-third aspect, a method of the twenty-third aspect, wherein the ceasing communication using the mobile telephone communication includes detaching the mobile communication apparatus from the first base station, and wherein the establishing communication using narrow band-internet of things communication includes attaching the mobile communication apparatus to the second base station.

In a thirty-fourth aspect, a method of the twenty-third aspect, further comprising: switching from discontinuous reception to extended discontinuous reception in response to a battery power level of the mobile communication apparatus falling below a second threshold, the second threshold being a battery power level lower than the predetermined threshold; and switching to power save mode in response to the battery power level of the mobile communication apparatus falling below a power save threshold, the power save threshold being a battery power level lower than the second threshold.

In a thirty-fifth aspect, a method of the twenty-third aspect, further comprising: switching from discontinuous reception to extended discontinuous reception upon a battery power level of the mobile communication apparatus falling below a second threshold, the second threshold being a battery power level lower than the predetermined threshold.

In a thirty-sixth aspect, a method of the twenty-third aspect, further comprising: switching from discontinuous reception to power save mode upon a battery power level of the mobile communication apparatus falling below a power save threshold, the power save threshold being a battery power level lower than the predetermined threshold.

In a thirty-seventh aspect, a mobile communication apparatus, comprising: a battery connected to supply power to the mobile communication apparatus; a first communication system in the mobile communication apparatus, the first communication system being constructed and operable to provide communication between the mobile communication apparatus and a first base station using a mobile telephone communication; a second communication system in the mobile communication apparatus, the second communication system being constructed and operable to provide communication between the mobile communication apparatus and a second base station using narrow band-internet of things communication; a control for switching from the mobile telephone communication using the first communication system to the narrow band-internet of things communication using the second communication system upon occurrence of a condition, the condition being selected from the set of conditions consisting of: a battery power level of the battery falling below a predetermined threshold, the mobile communication apparatus being out of range of the first base station, and receipt of a user command.

While the foregoing has been described in conjunction with exemplary aspects, it is understood that the term "exemplary" is merely meant as an example, rather than the best or optimal. Accordingly, the disclosure is intended to cover alternatives, modifications and equivalents, which may be included within the scope of the disclosure.

Although specific aspects have been illustrated and described herein, it will be appreciated by those of ordinary skill in the art that a variety of alternate and/or equivalent implementations may be substituted for the specific aspects shown and described without departing from the scope of the present application. This application is intended to cover any adaptations or variations of the specific aspects discussed herein.

The invention claimed is:

1. A method for operating a mobile communication device, comprising:
    establishing a first communication link between the mobile communication device and a first base station based on a mobile telephone communication;
    pausing the first communication between the mobile communication device and the first base station;
    establishing a second communication link between the mobile communication device and a second base station based on a narrow band-internet of things communication, the second communication link providing a reduced service communication compared to the mobile telephone communication of the first communication link, the reduced communication service being available at a lower power consumption level than the power level required for the first communication link and at a lower signal level than the signal level required for the mobile telephone communication.

2. A method as claimed in claim 1, wherein the pausing communicating and the establishing a communication link are performed in response to a battery level in the mobile communication device falling below a predetermined threshold, the predetermined threshold being a level required to maintain the mobile telephone communication between the mobile communication device and the first base station.

3. A method for operating a mobile communication device, comprising:
    establishing a first communication link between the mobile communication device and a first base station based on a mobile telephone communication;
    pausing the first communication between the mobile communication device and the first base station;
    establishing a second communication link between the mobile communication device and a second base station based on a narrow band-internet of things communication;
    wherein the pausing communicating and the establishing a communication link are performed in response to a battery level in the mobile communication device falling below a predetermined threshold;
    wherein the predetermined threshold is a first threshold; and further comprising:
    communicating between the mobile communication device and the second base station using the narrow band-internet of things communication based on a first communication type using a first battery power;
    pausing communicating using the narrow band-internet of things communication based on the first communication type in response to the battery level falling below a second predetermined threshold; and
    communicating using the narrow band-internet of things communication according to a second communication type in response to the battery level falling below the second predetermined threshold, the second predetermined threshold being a lower battery power level than the first predetermined threshold, the second communication type using less battery power than the first communication type.

4. A method as claimed in claim 3, further comprising:
    pausing communicating using the second communication type in response to the battery power level falling below a third predetermined threshold, the third predetermined threshold being at a battery power level that is lower than the second predetermined threshold; and
    communicating between the mobile communication device and the second base station using a third communication type in response to the battery power level falling below the third threshold, the third communication type using less battery power than the second communication type.

5. A method as claimed in claim 1, wherein the mobile telephone communication and the narrow band-internet of things communication are carried out along different signal pathways in a same base station, the first base station and the second base station being the same base station.

6. A method as claimed in claim 1, wherein the pausing communicating and the establishing communication are performed upon one of: the mobile communication device being out of range for mobile telephone communication with the first base station, and upon receiving a user command.

7. A method as claimed in claim 1, wherein the pausing communicating includes detaching a mobile telephone communication link between the mobile communication device and the first base station, and
    wherein the establishing communication included attaching a reduced service communication link between the mobile communication device and the second base station.

8. A method as claimed in claim 1, wherein the pausing communicating and the establishing communication includes a handover of the mobile communication device information from the first base station to the second base station.

9. A method as claimed in claim 1, wherein the narrow band-internet of things communication operates at frequencies that are in either guard band frequencies or in-band frequencies of the frequencies at which the mobile telephone communication operates.

10. A mobile communication apparatus, comprising:
   a first communication system configured to establish a first communication between the mobile communication apparatus and a first base station based on a mobile telephone communication, the first communication including voice communication; and
   a second communication system configured to establish a second communication between the mobile communication apparatus and a second base station based on narrow band-internet of things communication, the second communication being a reduced services communication lacking voice communication, the second communication being at one of a reduced power level than the voice communication and over an extended range compared to the voice communication.

11. A mobile communication apparatus as claimed in claim 10, wherein the second communication system is added-on to the first communication system.

12. A mobile communication apparatus as claimed in claim 10, wherein the second communication system is integrated with the first communication system.

13. A mobile communication apparatus as claimed in claim 10, further comprising:
   a control for switching between the first communication system and the second communication system upon detecting a predetermined condition.

14. A mobile communication apparatus as claimed in claim 13, wherein the predetermined condition is a condition selected from the set of conditions consisting of: a battery power level below a predetermined threshold, the mobile communication apparatus being out of range for the first communication with the first base station, and receipt of a user command to switch communication systems.

15. A method adapted to operate an apparatus used in a mobile communication device, the method comprising:
   establishing a first communication between a first base station and the mobile communication apparatus using mobile telephone communication, wherein the mobile communication apparatus is within range of the first base station for mobile telephone communication including voice communication and has a battery power level above a predetermined threshold, the predetermined threshold being sufficient for voice communication;
   pausing the first communication when the mobile communication apparatus is out of range for voice communication with the first base station or the battery power level is at or below the predetermined threshold;
   establishing a second communication between a second base station and the mobile communication device based on narrow band-internet of things communication, the second communication providing reduced services compared to the mobile telephone communication, the second communication lacking voice communication.

16. A method as claimed in claim 15, further comprising:
   resuming the first communication between the mobile communication apparatus and the first base station when the mobile communication apparatus is within range of the first base station or the battery power is above the predetermined threshold.

17. A method as claimed in claim 15, wherein the pausing the first communication is in response to receipt of a user command.

18. A method as claimed in claim 15, wherein the first base station includes a plurality of first base stations.

19. A method as claimed in claim 15, wherein the pausing communication using the mobile telephone communication includes detaching the mobile communication apparatus from mobile telephone communication with the first base station, and
   wherein the establishing communication using narrow band-internet of things communication includes attaching the mobile communication apparatus to the second base station.

20. A method adapted to operate an apparatus used in a mobile communication device, the method comprising:
   establishing a first communication between a first base station and the mobile communication apparatus using mobile telephone communication, wherein the mobile communication apparatus is within range of the first base station and has a battery power level above a predetermined threshold;
   pausing the first communication when the mobile communication apparatus is out of range of the first base station or the battery power level is at or below the predetermined threshold;
   establishing a second communication between a second base station and the mobile communication device based on narrow band-internet of things communication; and
   switching from discontinuous reception to extended discontinuous reception in response to a battery power level of the mobile communication apparatus falling below a second threshold, the second threshold being a battery power level lower than the predetermined threshold; and switching to power save mode in response to the battery power level of the mobile communication apparatus falling below a power save threshold, the power save threshold being a battery power level lower than the second threshold.

21. A method as claimed in claim 20, further comprising:
   resuming the first communication between the mobile communication apparatus and the first base station when the mobile communication apparatus is within range of the first base station or the battery power is above the predetermined threshold.

* * * * *